April 21, 1936.  W. WORTHINGTON  2,038,254

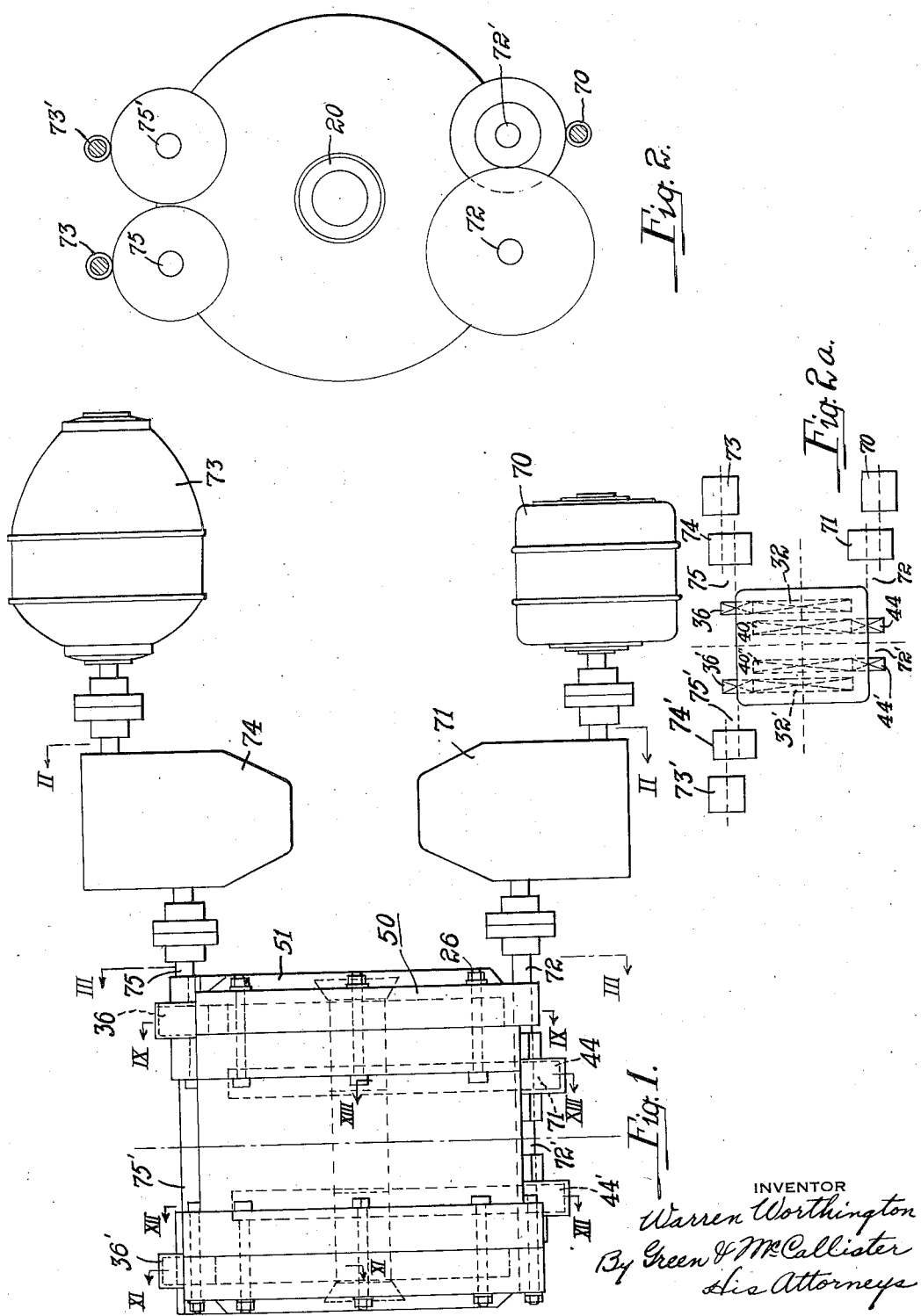
April 21, 1936. W. WORTHINGTON 2,038,254
SHEARING METHOD AND APPARATUS
Filed Nov. 10, 1932  4 Sheets-Sheet 1
INVENTOR
Warren Worthington
By Green & McCallister
His Attorneys

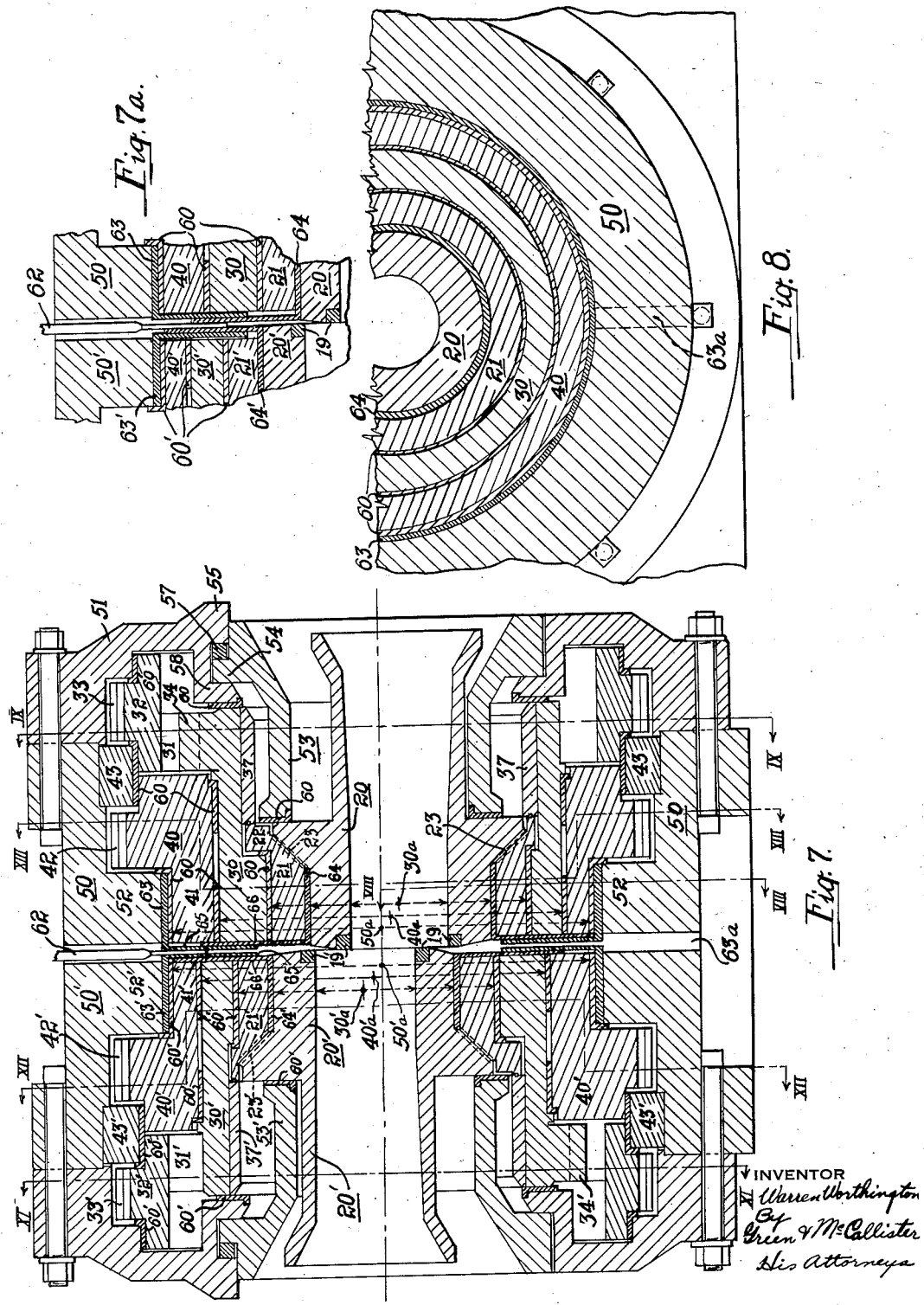

SHEARING METHOD AND APPARATUS

Filed Nov. 10, 1932 4 Sheets—Sheet 4

INVENTOR
Warren Worthington
By Green & McCallister
His Attorneys

Patented Apr. 21, 1936

2,038,254

UNITED STATES PATENT OFFICE 2,038,254

SHEARING METHOD AND APPARATUS

Warren Worthington, Pittsburgh, Pa.

Application November 10, 1932, Serial No. 642,049

25 Claims. (Cl. 164—40)

This invention relates to shearing procedure and to apparatus for shearing such materials as hot and cold metal. In one aspect the invention relates to mechanism for actuating the active part (or parts) of any apparatus wherein the acting part is moved in a cycle during its operation.

An object of the invention is to produce an improved mechanism in which the movement of an acting part may be controlled either by a predetermined relationship (including relative movement) of the motion producing elements or by varying such relationship during the cycle of operation of the acting part.

A further object is the production of a new procedure in connection with the actuation of an acting part of such machines as metal working shears, presses, and the like.

A more specific object is to produce an improved metal working shear which eliminates objectionable features inherent in such apparatus now in use and known to me.

In connection with such a shear, one feature of the invention is the provision of two coacting shear blades in which the cutting edge of each blade is in the form of a closed or substantially closed geometric figure and in which the relative motion of one blade with relation to the other is such that different portions of the cutting edges of the blades are successively rendered effective on the material or piece being cut, and that the direction of each successive cut is different from that of each preceding cut.

A further feature of the invention is the production of a shear in which the relative movement between the coacting blades is such that different portions of the cutting edge of each blade are successively rendered effective and in varying degrees throughout the cycle of operation.

All modern and commercial shears complete the severing operation in a single stroke. This causes some lateral or side spreading of the piece acted upon even though the shear blades are shaped to fit the piece, as closely as it is possible to obtain such a fit under practical operating condition. In addition, it is impossible with such apparatus to accomplish a severance without, to some extent, bending the piece being acted upon. If the blades could be made with no thickness, this bending of the piece would not occur, but, for the purpose of strength, the blades must be made of appreciable thickness, and as a result, the centers of pressure of the blades on the piece being acted upon do not coincide and therefore produce a strain couple in the piece that bends or tends to bend it.

In order to overcome these inherent defects in shearing apparatus, I employ a new procedure or a new method of shearing in which the piece to be sheared is subjected on one side to a slight or incomplete cut. This is followed by a slightly greater cut at a different portion of the piece and under such conditions that the cutting forces are applied at an angle to the direction of their application in accomplishing the first or initial cut. This procedure is followed by repeated cuts around the piece to be severed, and each successive cut may be of slightly greater depth than the preceding cut, but, the principle of operation is that the forces applied to the piece during the cutting operation offset each other in such a way as to limit and offset objectionable distortion or bending of the piece being severed.

While I have illustrated and described my invention in connection with a shear, it will be understood that the principle thereof may be embodied in any mechanism in which relative movement between two or more elements is employed and that the procedure as outlined may be followed even where the acting part (or parts) is not accomplishing a severance of the piece or material acted upon.

In the present embodiment of my invention I employ what may be termed cyclical or epicyclical motion in obtaining the desired movement of the acting part or parts; and, it will be understood that by varying the relative proportions of the motion producing elements, or by varying the rate and/or direction of motion of these elements, I may obtain any desired movement of the acting part or parts, and such variation is therefore contemplated as falling within the scope of this invention.

In the drawings accompanying and forming a part hereof, Figure 1 is a plan view of a metal working shear embodying my inventon;

Fig. 2 is a diagrammatic sectional view along the line II—II of Fig. 1, with the casings of the reducton gears removed;

Fig. 2a is a diagrammatic plan view (on a reduced scale) of the apparatus shown in Figs. 1 and 2, but disclosing a somewhat different arrangement of that apparatus;

Fig. 7 is a longitudinal sectional view along the line VII—VII of Fig. 3;

Fig. 7a is a fragmental section taken along the same line as Fig. 7, but discloses a modified arrangement of the devices for delivering cooling and flushing liquid to the shear blades.

Fig. 8 is a fragmental transverse sectional view along the line VIII—VIII of Fig. 7;

I have discovered that one or both blades must be moved in such a way that a point on the moving blade (if one only is moved) generates a line corresponding to a line generated where relatively movable planes are employed for generating a curve. That is to say, the line generated by a point on the moving blade (if one only is moved) may be a cycloid, an epicycloid or a hypocycloid, or may be the result of cycloidal, epicycloidal or hypocycloidal motion. Where both blades are moved, the relative motion between a point on one blade (for example, the center of the blade) and the other blade may be cycloidal, epicycloidal or hypocycloidal. To express this another way, the relative movement between a point on one blade, with relation to the other blade, when both blades are moving, may be said to be a cycloidal movement wherein the term cycloidal is used in a broad sense to cover the variations above contemplated, or is used in even a somewhat broader sense than the geometric term "roulette". In the illustrated embodiment, I move both blades along such paths that the center of each blade generates a spiral and the relationship is preferably such that the spirals so generated originate at a common point but extend in opposite directions. The relative motion of the two blades illustrated may also be expressed by stating that a point on one blade (for example the center thereof) moves along a hypocycloidal path with relation to the other blade, or along a cycloidal path where the term "cycloidal" is used in the broad sense heretofore mentioned.

Figure 4:
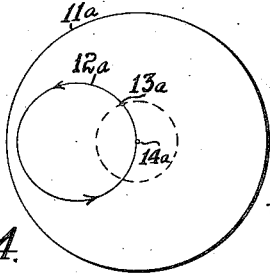
Fig. 4 is a descriptive diagram employed for the purpose of aiding in the description of the principle of operation utilized in connection with the operating parts.
Figure 11:
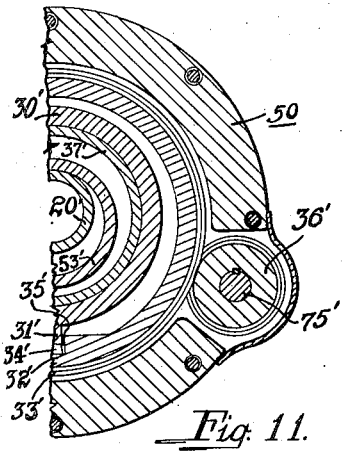
Figs. 11 and 12 are fragmental sectional views taken on the lines XI—XI and XII—XII, respectively, of Figs. 1 and 7.
Figure 12:
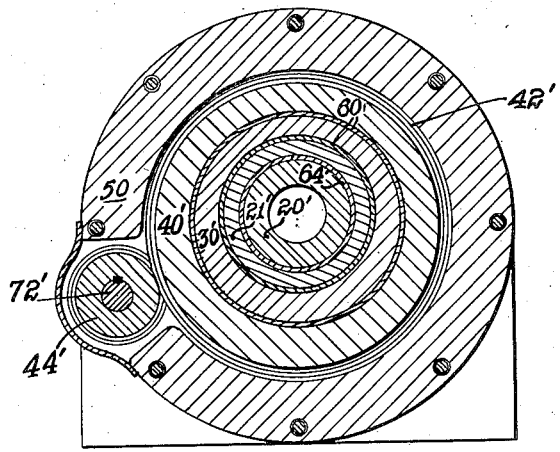

In considering such movement of the blades, I first refer to Fig. 4, wherein I have disclosed a large circle 11a enclosing a smaller circle 12a, and assume that the smaller circle is carried by the larger. If the large circle is turned about its center 14a every point of the small circle will describe a circumference of a circle around the center of the large circle. If, however, during the rotation of the large circle, the small circle is turned more slowly about its center, then a point, such as the point 13a, on the circumference of the smaller circle, will describe a spiral about the center 14a of the large circle, and the spiral will be somewhat similar to either the dotted or full line spiral shown in Fig. 5. In this connection it will be understood that the form or slope of the spiral, and as a matter of fact, the character of the curve generated, will depend upon the relative rotation of the two circles, and that a spiral will be generated even though the smaller circle turns somewhat faster than the larger.

Figure 5:
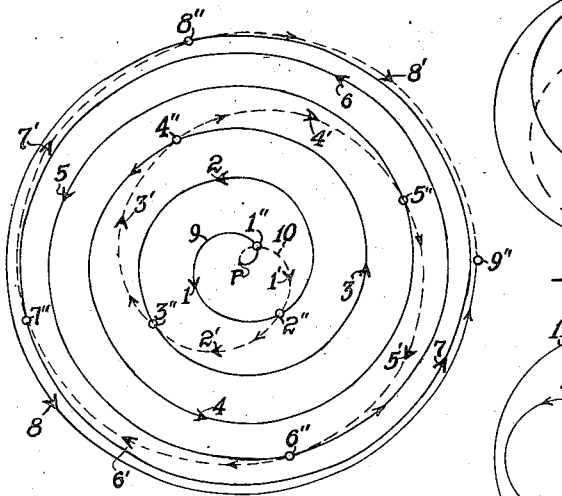
Fig. 5 is a descriptive diagram disclosing suitable paths of movement of the centers of each of the opposed shear blades.

In connection with Fig. 5 it should be stated that the spiral is somewhat distorted for convenience of illustration. It will also be apparent that if I employ two circles, such as the circle 11a, with their centers coincident and if each of these circles carries a smaller circle, such as the circle 12a, that then, by rotating the larger circles in opposite directions while rotating the smaller circles at a less or even a slightly greater speed of rotation than their respective carrying circles, two spirals, substantially as illustrated in Fig. 5, will be generated by points corresponding to the point 13a of both the smaller circles.

Figures 6, 6A:
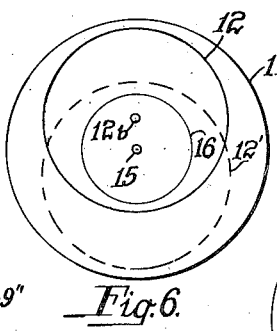
Figs. 6 and 6a are descriptive diagrams illustrating positions of parts of the shearing mechanism during different stages of their operation.

In Fig. 6, the circle 11 corresponds to the circle 11a of Fig. 4 and the circle 12, although differently located with relation to the circle 11, corresponds to the circle 12a of Fig. 4. It will therefore be apparent that a point 15 taken on the smaller circle 12 and corresponding in location to the center 14a of the larger circle 11a, will generate a spiral if the larger circle is turned about its center while the smaller circle carried by it is also turned about its center as described in connection with Fig. 4.

In Fig. 6, the circle 16 may be taken as illustrating a circular knife blade of a shear that is mounted in order to move around the center 12b of the circle 12 as that the circle is turned about its center. It will then be apparent that the center 15 of the circle 16 will trace a spiral when both the circles 11 and 12 are rotated as described in connection with Fig. 4. In Fig. 6a, I have shown in full and dotted line positions, the extreme positions of the circles 16 under the conditions of motion described, and it will be understood that the dotted circle 16' may represent a separate shear blade such as illustrated by the circle 16, and that therefore Fig. 6a may represent the extreme positions of two opposed blades 16—16' where each blade is mounted for movement, such as described; the mounting elements are so arranged and so driven that one blade moves in the spiral corresponding to the full line 9 of Fig. 5 and the other blade moves in a spiral corresponding to the dotted line 10 of that figure. Assuming again that the circles 16 and 16' of Fig. 6a represent opposing knife blades, it will be apparent that the edges of these knife blades coincide when their centers coincide and that their centers coincide at points of intersection of the two spirals illustrated in Fig. 5. For example, it is apparent that the opposing circles 16 will be coincident at the points indicated by numerals 1'', 2'', 3'', 4'', etc. in Fig. 5.

In laying out the spiral 9 of Fig. 5, I have assumed a relative speed of rotation of 45 to 48¾ in connection with the circles 11 and 12 of Fig. 6, and in laying out the spiral 10, I have assumed a relative rotation between those circles of 15 to 18¾. It is apparent in laying out the spiral 10, that the circle 11 was considered as rotating in the opposite direction from its rotation in the generation of the spiral 9. Inasmuch as Fig. 5 indicates that the circles 16 and 16' periodically move into coincidence during a complete cycle, it also indicates that the circles move to divergent positions between points of coincidence. It will be noted that the points 1 and 1' indicate the extreme divergence of the circles 16 and 16' between the points of coincidence 1'' and 2'' and that likewise the points 2 and 2' represent the points of extreme divergence between the points of coincidence 2'' and 3'', etc. It is therefore apparent that the points 8 and 8' represent the positions of maximum divergence of these circles during the cycle. It will also be apparent that the successive movements from positions of coincidence to positions of divergence will be along different lines of movement, and that therefore a different portion of the cutting edge of one blade will initially intercept the line of the cutting edge of the other blade in each such successive movement. Thus, there may be a periodical reversal of the applied portions of the cutting edges during a shearing operation.

With the speed ratios adopted for laying out the spirals, each spiral if continued would return again to the point of origin or to the point P (see Fig. 5), and that therefore, during a complete cycle, the opposed circles 16, 16' or opposed shear blades represented by those circles, will alternately move from a position of coincidence to a position of divergence, and that the extent or degree of the divergence will increase throughout the first or cutting part of the cycle until the point of maximum divergence is reached, and then decrease throughout the remaining or return part of the cycle.

It will be understood that the form of the spirals, and in fact, the character of the curves traced by the centers of the circles 16 and 16', will depend upon the speed of the rotation of the two circles 12 and 12' and upon the speed ratios of each circle 12 and its carrying circle 11; therefore the number of points of coincidence may be varied by changing speed relationships, and this variation will also cause some variation in the relative movement of the circles 16—16' between their positions of coincidence, and in movement from positions of divergence back to coincidence. The same effect can be accomplished in degree by rotating both the circles 11 in the same direction, but at different speeds.

From the foregoing it is apparent that Fig. 6 illustrates generally the relation of the parts insofar as the mounting of one shear blade is concerned and it may be said that the circle 11 corresponds to what I will later term the primary eccentric, and that the circle 12 corresponds to what I later term the secondary eccentric; and as stated, the circle 16 corresponds to the cutting edge of a circular knife blade. That is to say, the circle 11 is provided with an eccentrically located circular opening in which the circle 12 or the secondary eccentric is rotatably mounted, and the circle 12 or secondary eccentric is provided with a circular opening, corresponding to the circle 16, in which the shear blade is mounted.

In the embodiment of the invention illustrated in Fig. 7 and the related figures, I have illustrated opposed shearing elements 20 and 20', each of which carries an annular shear blade 19. It will however be understood that the shape of the cutting edge of the blade will in a large measure be determined by the shape of the piece to be cut. For example, where the piece to be cut is a bar, rectangular in cross section, the cutting edge of the blade may be made up of straight edges arranged in a rectangular relationship. It will also be understood that while the cutting edges of the blades 19 are shown in divergent positions, that during the cycle, they will successively move from positions of coincidence to divergence, and that the piece to be cut is inserted through one element 20 and into the other 20' when the two blades 19 and 19' are in coincidence at the beginning of a cycle.

Inasmuch as the apparatus is bi-laterally symmetrical I will only describe in detail the operating mechanism associated with the shear element 20. As indicated in connection with the description of Fig. 6, the shear element 20 is carried by a secondary eccentric 30, which in turn is carried by a primary eccentric 40. The primary eccentric is in turn mounted within a casing 50, and both the eccentrics are provided with separate driving means. It will, of course, be understood that the opposed series, represented by prime suffixes and including shear element 20', is correspondingly mounted, that its mounting elements are enclosed within the casing 50, and that the primary eccentric 40' and the secondary eccentric 30' are both separately driven.

Figure 3:
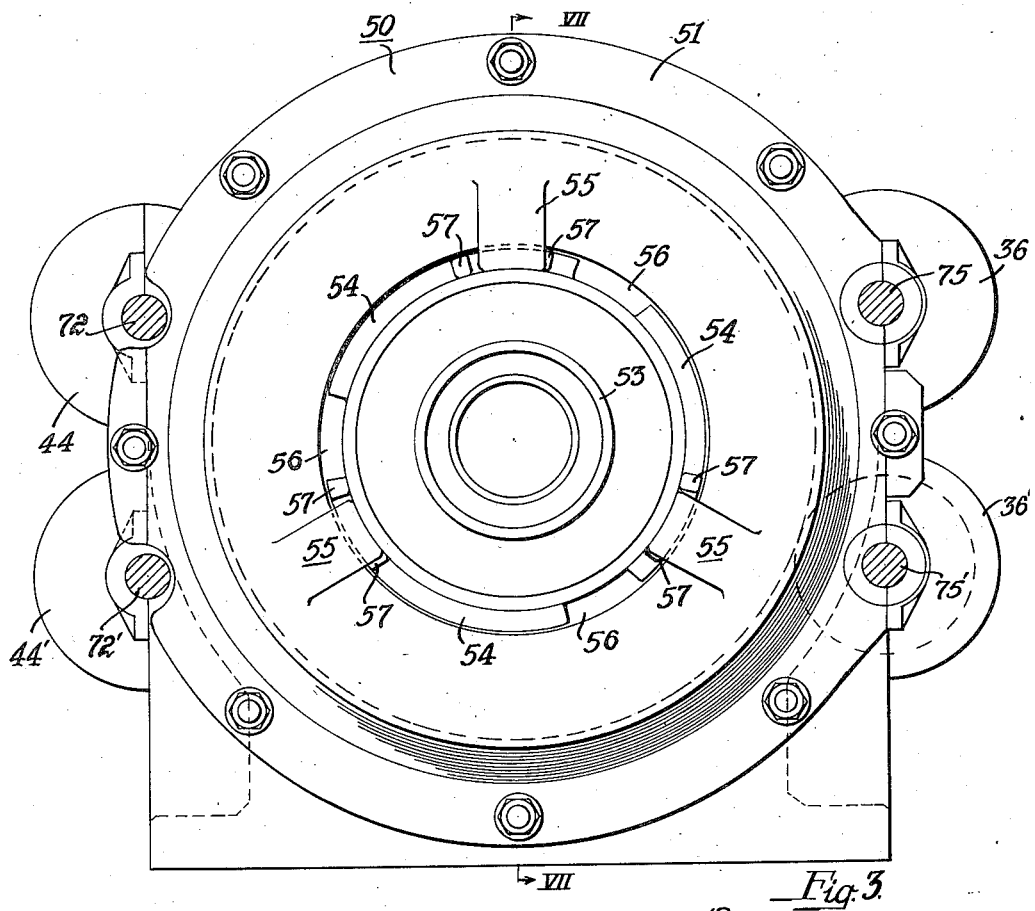
Fig. 3 is an enlarged sectional elevation along the line III—III of Fig. 1.
Figure 13:
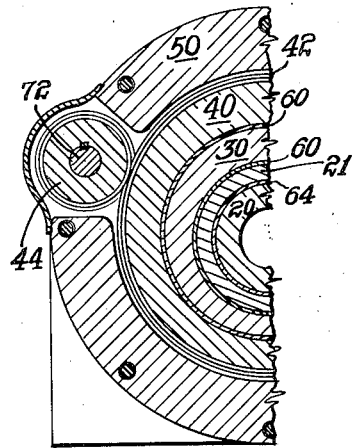
Fig. 13 is a fragmental sectional view taken along the line XIII—XIII of Fig. 1.
Figure 9:
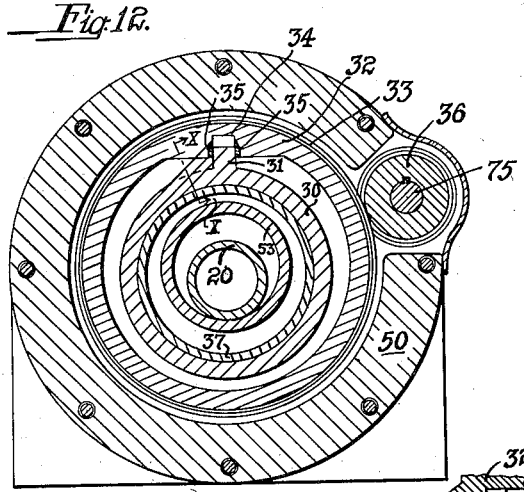
Fig. 9 is a transverse sectional view along the line IX—IX of Figs. 1 and 7.
Figure 10:
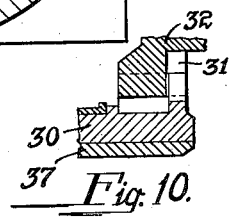
Fig. 10 is an enlarged fragmental sectional view showing a detail of the apparatus and is taken along the line X—X of Fig. 9.

The casing 50 is provided with a central bore, the axis of which is coincident with the longitudinal central axis of the apparatus, designated by 50a in Fig. 7. This bore is adapted to receive and form a support for the primary eccentric 40. As shown, the eccentric 40 is provided with a lateral extension 41, the outer surface of which is cylindrical and whose axis is coincident with the axis 50a; the eccentric 40 is also provided with an annular set of gear teeth or a gear ring 42 mounted on the outer face of a radial extending cylindrical shoulder that is adapted to cooperate with the shoulder 52 of the casing in order to position the eccentric. The pitch circle of the gear teeth 42 is concentric with the outer cylindrical surface of the extension 41 and its center is thus represented by numeral 50a. A positioning ring 43 fits within an enlarged bore of the cylindrical casing 50 and provides an additional bearing surface for eccentric 40. The gear teeth 42 of eccentric 40 are driven by a pinion 44 (see Figs. 1, 3 and 13), which as hereinafter more fully described, is suitably journalled on bearings carried by the casing.

The eccentric 40 is provided with an eccentric cylindrical bore, the center of which is indicated at 40a in Fig. 7. This bore receives and forms a support for the secondary eccentric 30.

As shown, the secondary eccentric 30 is provided with a lateral extension which projects beyond the bore of the primary eccentric 40, and has an ostrich neck 31 for forming a driving connection between the eccentric and a ring gear 32. The ring gear 32 is provided with an annular series of gear teeth 33 and its outer surface is shouldered to provide two peripheral bearing surfaces, one of which is engaged by the positioning ring 43 and the other of which is engaged by a cylindrical shoulder formed on an end cover plate 51 of the casing 50. This ring gear 32 is mounted concentrically with respect to the center of the casing 50 and its axis of rotation therefore is coincident with the axis of rotation of the primary eccentric or is coincident with the axis 50a of the casing 50.

In order to drive the secondary eccentric 30 through the agency of the ring gear 32 and to at the same time permit it to move eccentrically with relation thereto, the neck 31 extends into a slot 34 formed in the inner peripheral face of the gear 32. In order to approximate a universal connection between the ring gear and the secondary eccentric, I provide partially cylindrical buttons 35 on each side of the ostrich neck 31, which are slidingly mounted on the neck and which cooperate with correspondingly formed depressions in the sides of the slot 34. The ring gear 32 is driven by means of a pinion 36 which is journalled on the casing 50; with this arrangement of driving connections the secondary eccentric 30 is positively driven, but is permitted to move eccentrically with relation to its driving gear 32 during its rotation.

The secondary eccentric is provided with an eccentric bore, the central axis of which is indicated by the numeral 30a in Fig. 7; and, the shear element 20 is carried within this bore. As shown, the shear element is provided with a carrying ring 21, which is provided with a lateral extension projecting into and journalled within the eccentric bore of the secondary eccentric 30. This ring is provided with a radially extending shoulder 22, which cooperates with a reentrant shoulder formed on the secondary eccentric for the purpose of holding the secondary eccentric against lateral motion, as will hereinafter be described. The inner surface of this ring 21 is concentric with its outer surface and is provided with an inclined annular face, which in turn is provided with a series of splines or keys 23, which may be either separately or integrally formed thereon. The shear element 20 is provided with a cylindrical portion which projects into the cylindrical portion of the bore of the ring 21; it is also provided with a tapered or conical portion which has a series of splines or ridges so formed as to interleave with the splines or keys 23 and to lock the element 20 against rotation with relation to the carrier ring 21.

In assembling the apparatus described, the primary eccentric is first moved into place within the bore of the casing 50 in such a manner that its gear carrying shoulder abuts against the lateral face of the shoulder 52 of the casing. The positioning ring 43 is then moved into place within the casing. The secondary eccentric 30 is then fitted into the eccentric bore of the primary eccentric and a thrust sleeve 37 is moved into place within a portion of the eccentric bore of the secondary eccentric. The cover plate 51 may then be secured to the casing 50 by means of bolts as shown. The carrier ring 21 may be inserted into the eccentric bore of the secondary eccentric 30 either before or after the eccentric 30 is mounted within the casing. The shear element 20 is fitted into the carrier ring 21 and is held in place by means of a thrust collar 53, which in turn engages a radially extending shoulder formed on the element 20 and holds the interlocking splines of that element in engagement with the interlocking splines or keys 23 of the carrier ring 21.

The thrust collar 53 is adapted to be quickly removed from the assembly for the purpose of permitting a ready change of the element 20; and, the arrangement is such that the removal of the collar will not affect the positioning of the parts 21, 30, and 40 within the casing. For this purpose a bayonet joint is provided between the collar and the cover plate 51. The outer end of the collar 53 is provided with bayonet joint flanges 54 that cooperate with corresponding flanges 55 formed on the cover plate 51 (see Figs. 3 and 7). The flanges of the collar 53 in reality comprise a plurality (as illustrated three) of short length flanges 54 having slots or a spacing 56 between each other that are approximately the same width as each of a plurality (as illustrated three) of the radial lips 55, and in effect, form the bayonet joint between the collar 53 and the cover plate 51. This joint may be readily released by knocking out arcuate or somewhat semi-circular keys 57, and then, by giving the collar a partial turn (counterclockwise as viewed in Fig. 3) so as to free hidden portions of its flanges 54 from the flanges or lips 55, and to center the lips over the spacing 56 and permit the withdrawal of the collar. During this operation the flanges 54 move freely past the lips 55.

Bearing metal insets 60 are provided for the various bearing surfaces, and in this connection, it will be noted that the lateral thrust of the primary eccentric 40 is taken up by the collar 52 and also by the secondary eccentric 30; a radial shoulder is formed on the eccentric 30 that cooperates with the correspondingly formed shoulder on the bore of the eccentric 40 and the lateral thrust imposed on the primary eccentric 40 is thus taken up by suitably formed bearing surfaces provided on the cover plate 51. The positioning ring is held firmly in place between the cover 51 and a shoulder formed on the casing 50. The thrust sleeve 37 moves eccentrically of the cover plate 51, but even so, both it and the secondary eccentric 30 are held in place against lateral motion by a reentrant flange 58 formed on the cover plate. The lateral thrust imparted to the shear element 20 and its carrier ring 21 is taken up by the form of the ring bearing within the eccentric 30 and also by the cooperation of the thrust sleeve 37 and the thrust collar 53.

In the drawings I have shown means for delivering a flow of cooling water to the interior of the casing 50 in such a way that heat is carried away from the shear blades 19. This flow of water also flushes the cutting edges of these blades in such a way as to carry off loosened scale or other foreign particles such as may result from the shearing operation. As shown, a water delivery nozzle 62 projects into an aperture formed in the casing 50 and is so located that it delivers an adequate flow of water to the space intervening between the driving elements of each shearing element 20—20'. This space also communicates with a discharge aperture 63a formed within the casing 50. It will be apparent that two or more delivery nozzles and discharge apertures may be employed if desired and that they may be suitably spaced around the casing 50.

In order to prevent the cooling and flushing water from entering the lubricant space within the casing, I provide overlapping guards 63 and 64, which in effect form a lining for the water delivery passage located between the two series of eccentric elements. As shown, the annular guard 63 is held in place between the shoulder 52 of the casing and the extension 41 of the primary eccentric; it is provided with an inwardly projecting radial annular disc 65 which overlies the inner ends of the eccentrics 30 and 40. The guard 64 is similarly formed and is held in place between the carrier ring 21 and the shear element 20; its annular guard flange 66 projects radially outward and overlaps the flange 65.

With this arrangement the interior of the casing is in effect provided with two lubricant chambers which are located on opposite sides of the flushing water passage. Any suitable means may be provided for delivering lubricant to and draining lubricant from these chambers and it will be apparent that the chambers provide adequate means for lubricating the gears and the bearing surfaces of all the parts; the lubricant level within the chambers may be of a height sufficient to partially submerge the bearings and gears.

As previously stated, each eccentric is preferably separately driven. In Figs. 1, 2 and 2a, I have shown a more or less diagrammatic layout of the driving mechanism. As there illustrated, the primary eccentrics of both series—viz., the right and lefthand series shown in Fig. 7—may be driven by a motor 70 through the agency of a speed-change gearing 71. The gearing 71 is provided with two driven pinions, one of which drives the pinion 44 through the agency of a shaft 72 and the other of which drives the corresponding pinion 44' through the agency of a shaft 72'. Suitable clutches or couplings are shown between the motor 70 and the speed change gear and also between that gear and the driven shafts.

Each of the secondary eccentrics 30 is provided with a separate driving motor 73—73'. A speed-change gear 74 is coupled to the motor 73 and drives a shaft 75 on which the driving pinion 36 is mounted. The motor 73' drives the pinion 36' through corresponding apparatus and both 73—73' are preferably direct current, variable speed motors, whereas the motor 70 may be an alternating current motor of the constant speed type.

Fig. 2a is a diagrammatic view in which the motors 73 and 73' and their cooperating speed change gears 74 and 74' are located on the opposite sides of the casing 50. It will, of course, be apparent that the motor 70 may be replaced by a variable speed motor, or even by two variable speed motors, each driving one of the two primary eccentrics; but, under ordinary operating conditions sufficient flexibility in the operation of the apparatus may be obtained by varying the speeds of the secondary eccentrics. While the various eccentrics may be driven at any desired speed, I have driven one primary eccentric at 15 R. P. M. and the other at 45 R. P. M. I have also driven the high speed secondary eccentric at speeds varying between 30 and 120 R. P. M. and the low speed secondary eccentric at speeds varying between 10 and 40 R. P. M.

It will be apparent that each cutting operation during a cycle is accomplished by moving the blades 19—19' out of coincidence and that the number of such operations per cycle may be varied by varying the relative speeds of the eccentrics. It will be understood that by so driving the eccentrics that one knife moves three times as fast as the other, the cooperation between the knives will accomplish a cut at about every 90 degrees of motion of the slow moving knife and at about every 270 degrees of motion of the other knife. This will produce four cuts substantially 90 degrees apart; and such a speed ratio could be effectively employed in shearing a bar of square cross section. A change in the ratios of these speeds will change the number of cuts per revolution of the slow moving blade. For example, if one knife moves through 60 degrees while the other moves through 300 degrees, a shear cut will be made for about every 60 degree movement of the slow moving knife or six cuts will be made during the cutting cycle, as described in connection with the spirals of Fig. 5. Such a speed relation would be desirable in shearing bars of hexagon cross section. From the foregoing it will also be understood that one of the shear blades may be held stationary during the operation of the mechanism and that all variations between the speeds of the various eccentrics will not only vary the number of cuts per cycle, but will also vary the extent or degree of divergence of the opposed knives between successive cuts, and in this way that the operation of shearing of each particular piece will be under the direct control of the operator.

It will be noted from the diagram of Fig. 5 that each movement of the blades from a position of coincidence to a position of divergence will be along lines at an angle to the lines of preceding relative motion, and that, therefore, the blades will not only act successively on different portions of the piece to be cut, but a different portion of the cutting edge of each blade will be rendered effective at each successive cut. In addition, the amount of divergence of the blades varies in each cut. With the operating mechanism illustrated, the amount of divergence increases during the first part or the cutting part of the cycle. From the foregoing it is apparent that by changing the relative speeds of rotation, the operator can not only change the number of cuts, but can also control the direction and extent of the successive cuts. It is thus apparent, that cuts may be made around the piece of material being sheared in a discontinuous manner by jumping from one point to another thereabout.

A number of advantages are derived from my invention, and it will be clearly apparent that production may be materially increased over sawing and other cutting off methods now employed. I have also found from actual test, that the severed edges of a cylindrical rod sheared by my apparatus are slightly rounded off and that objectionable distortion of the severed piece and objectionable burrs are eliminated. It will also be apparent that this rounding off of the severed edges and lack of distortion in the piece will be accomplished even where square bars or irregularly shaped pieces are severed, since the direction and magnitude of each successive cut can be controlled as above described.

With these advantages it will be apparent that a shear embodying the features of my invention and operating in accordance with the method constituting my invention, may be employed in connection with work which heretofore necessitated the slower and wasteful procedures involved in connection with the use of saws and cutting off tools.

While I have illustrated but one embodiment of my invention it will be apparent that various changes, additions and omissions may be made in the apparatus illustrated and that the procedure of accomplishing each cut may be varied without departing from the spirit and scope of my invention as defined by the appended claims.

What I claim as new and desire to secure by Letters Patent is:

1. A method of shearing a piece which includes subjecting the piece to a pair of oppositely-directed shearing forces while moving the points of application of the forces in a definite timed relationship around the periphery of the piece.

2. A method of treating a piece which includes successively subjecting the piece to a pair of treating forces acting at different angles, and variably timing the degree of effectiveness of the forces throughout a shearing cycle.

3. A method of treating a piece which includes successively subjecting the piece to oppositely-directed treating forces and moving the forces in a converging-diverging path around the periphery of the piece and with respect to each other during a shearing cycle.

4. A method of shearing a piece which consists in successively subjecting the piece to a shearing force acting at different angles, and in successively reversing the point of application of the force to the piece.

5. A method of shearing a piece which consists in successively subjecting the piece to a shearing force of a timed varying intensity acting at different angles in substantially the same plane, and applied at different points around the perimeter of the piece.

6. A method of shearing a piece which consists in successively subjecting the piece to shearing forces of a timed varying intensity acting in substantially the same plane, while varying the point of application of the forces to said piece, so that the direction of application is successively reversed.

7. A method of shearing a piece which consists in subjecting the piece to a shearing force while jumping a pair of opposite points of application of the force about the piece, so as to vary the direction of strain couples set up within the piece.

8. A method of shearing a piece which consists in surrounding the piece by opposed shear blades, and in moving the axial centers of both of said blades along curved paths with relation to each other.

9. A method of shearing which consists in surrounding the piece to be sheared by opposed shear blades, and then, in moving each blade along a path periodically intersecting the path of the other blade.

10. A method of cutting a piece which consists in holding the piece, and in applying a pair of cutting forces at a selected number of points around the piece while moving the force application in a cycloidal path with relation to the piece.

11. A method of cutting a piece which consists in subjecting the piece to a plurality of partial cuts around the perimeter thereof, and in a timed relationship therewith, progressively increasing the depth of such cuts.

12. In combination in a shear, opposed shear members for receiving a piece to be sheared, and means for a number of times successively moving said members into and out of register with each other during a shearing cycle.

13. In combination in a shear, a plurality of shear members, and means for moving each of said shear members in a cycloidal path with respect to a piece being sheared.

14. In combination in a shear, opposed shear members for receiving a piece to be sheared, and means for, during the shearing operation, successively moving said members into coincident and divergent positions and along a line of travel in moving to each divergent position which differs from the line of travel during such motion next preceding.

15. In combination in a shear, opposed shear blades positioned to surround the piece to be sheared, and means for subjecting the piece to progressively applied, oppositely-directed and periodically reversed portions of said shear blades.

16. In combination in a shear, shear blades, means for successively moving the axial center of said blades to coincident and divergent positions comprising a plurality of interconnected eccentrics for acting on such shear blade.

17. In combination in a shear, opposed shear blades, and means for moving each shear blade along a spiral path comprising a plurality of interconnected eccentrics for actuating each shear blade.

18. In combination in a shear, opposed shear blades, a plurality of nested eccentrics for actuating each such blade, and means for driving each such eccentric.

19. In combination in a shear, a shear blade, a pair of operatively nested eccentrics for actuating said blade, and means for driving each of said eccentrics.

20. In combination in a shear, a shear blade, a plurality of operatively associated eccentrics for actuating said blade, one of said eccentrics being nested within the other, means for driving the outer of said eccentrics, and a compensatable means for driving the inner of said eccentrics.

21. In combination in a shear, a shear blade, a pair of nested eccentrics for actuating said blade, a gear, means extending from the outer of said eccentrics for driving it, a ring gear, and a universal joint connection between said ring gear and the inner of said eccentrics for driving said eccentric and permitting it to move eccentrically with reference to said ring gear.

22. In combination in a shear mechanism, a housing, a primary eccentric mounted concentrically within said housing, a secondary eccentric carried by the primary eccentric and mounted eccentrically within said housing, a gear operatively connected to said primary eccentric for rotating the same, a gear operatively connected to said secondary eccentric for rotating the same relatively to the primary eccentric, a shear element carried by said secondary eccentric, a second shear element, means for locking both said eccentrics and said shear elements within said housing, and separate means for driving each such gear.

23. In a shearing mechanism having a rotary member therein and a shear member mounted in the rotary member, of a casing for said mechanism, said casing including a hollow body portion, end portions removably secured to said body portion and having faces for holding said rotary members in position therein, and means mounted in one of said end portions for removably holding the shear member in place within the rotary member.

24. In combination in a shear, shear blades, and means for moving both of said blades completely around a piece of material being sheared in a cycloidal path.

25. In combination in a shear, opposed shear members encircling a piece to be sheared, and means for moving one of said members eccentrically and concentrically with relation to the other prior to the completion of a shearing movement about the piece being sheared.

WARREN WORTHINGTON.